March 17, 1931. T. A. BANNING, JR 1,796,313
METER AND THE LIKE
Original Filed April 18, 1927 2 Sheets-Sheet 1
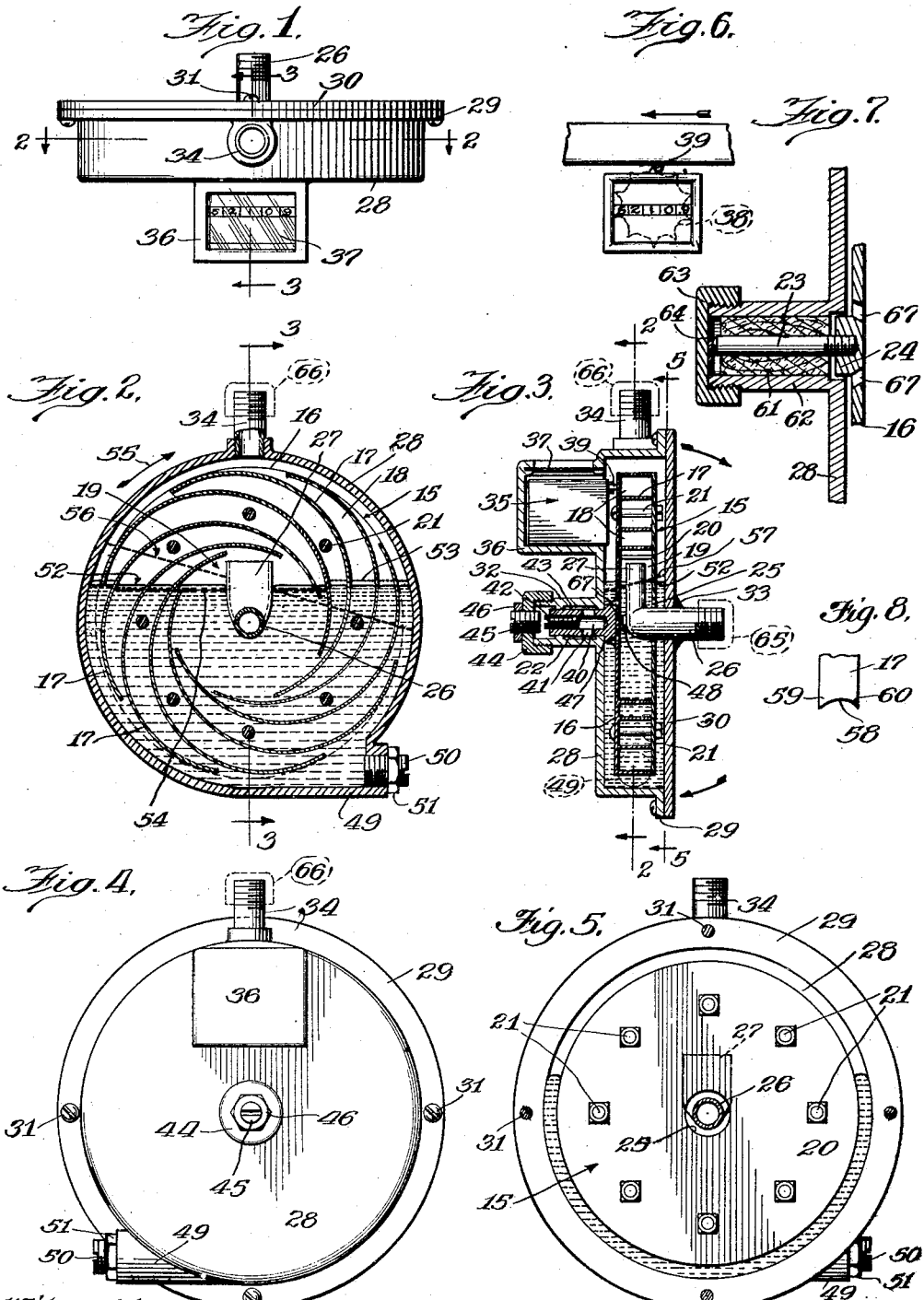

March 17, 1931.  T. A. BANNING, JR  1,796,313
METER AND THE LIKE
Original Filed April 18, 1927  2 Sheets-Sheet 2
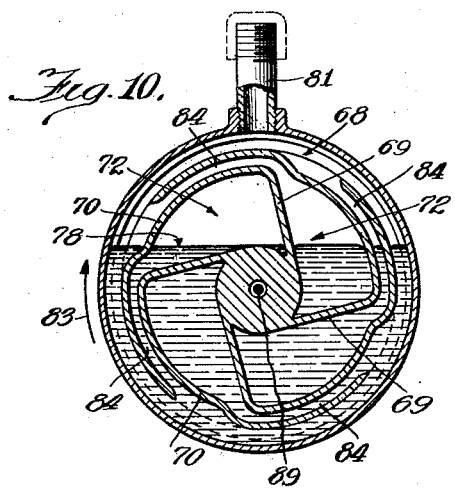
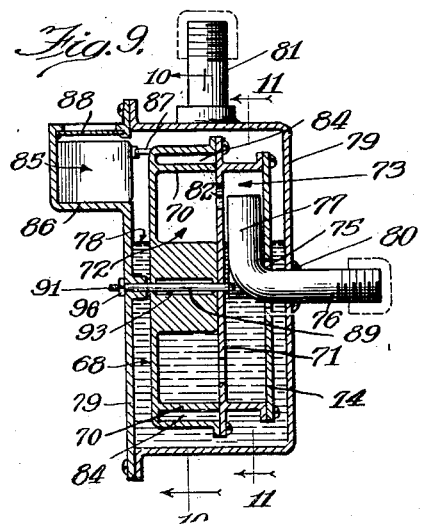
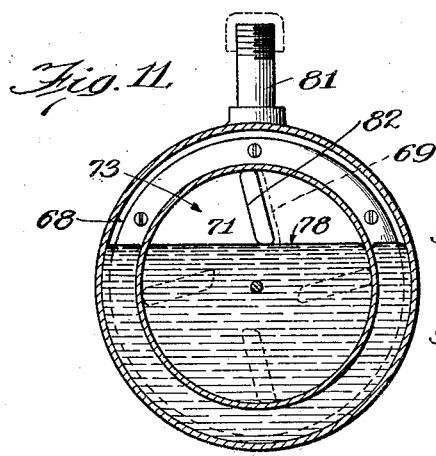
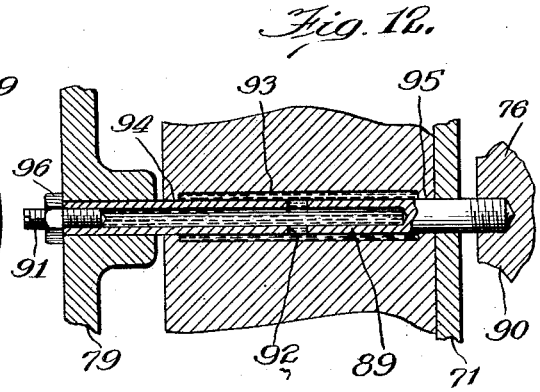
Witnesses:
Inventor:
Thomas A. Banning Jr.

Patented Mar. 17, 1931

1,796,313

UNITED STATES PATENT OFFICE

THOMAS A. BANNING, JR., OF WILMETTE, ILLINOIS

METER AND THE LIKE

Application filed April 18, 1927, Serial No. 184,756. Renewed July 31, 1930.

This invention relates to improvements in meters and the like. The meters herein disclosed are especially intended for use in the metering of liquid fuels such as are used in the propulsion of internal combustion engine driven vehicles, but it will presently appear that the meters herein disclosed may also be used for the measurement of many other kinds of liquids than such liquid fuels as are used for the foregoing purposes. Therefore I do not limit myself or the usefulness of the invention to the foregoing, except as I may do so in the claims.

Nevertheless, the meters herein disclosed have been devised especially with a view of meeting the conditions of operation and otherwise imposed in the operation of such vehicles as just above referred to, and therefore I have illustrated herein, and shall describe in detail, instruments intended for this particular class of service, but in so doing I do not limit myself except as already stated.

It will be understood that any instrument which will successfully meter the gasoline or other fuel for such service must be so constructed that it will accurately meter the flow of the fuel under very small rates of flow, since it will be understood that even with the vehicle running at a high rate of speed and with full open throttle, the engine only consumes a few gallons of fuel per hour, and when the engine is idling this rate of consumption may be as low as a fraction of a pint per hour. Furthermore, the instrument should be so designed and constructed that it will meter with exact accuracy at the low as well as the high rates of flow, and at all intermediate rates. In this connection, the meter should be so designed that the fuel cannot seep past the registering devices without causing them to function, as this would cause on incorrect reading, but it should be so arranged that even the smallest rates of flow such as would ordinarily be classed as seepages will cause a proper registry to be made.

In connection with the foregoing, the meter should also be so designed that it will not materially interfere with the full and free flow of the fuel, since the proper delivery of the fuel to the carburetter must not be impeded, and in this connection the meter should be so designed that the loss of pressure head of the fuel will be inappreciable, thereby making it possible to use the meter in connection with gasoline feed and delivery systems now extensively in use, and without the need of redesigning said systems to make possible the use of these meters. It will be understood that the pressure head available for delivery of the gasoline to the carburetter is generally less than one pound per square inch, and the meters herein disclosed are so arranged that they will not require more than the small fraction of an ounce per square inch to cause them to function, thereby not interfering appreciably with the free delivery of pressure to the carburetter. Furthermore they are so arranged that a full and unrestricted opening of delivery is made available, so that the loss of pressure head will be inappreciable not only with small rates of flow, but also with the full rates of flow incident to high speed operation with wide open throttle.

A further feature of the invention relates to the provision of a meter construction such that its accuracy of operation will not be impaired by change of grade on which the vehicle may be operating either up or down, or on a level; and also such that the accuracy of operation will not be impaired by tilting of the vehicle either towards the right or the left, as for example when the vehicle is travelling close to one or the other curb instead of on the crown of the road. In connection with the foregoing features the meter herein disclosed is so arranged that it will operate accurately under very wide changes of gradient, etc., so that it will be accurate for all conditions which may be encountered in actual service.

A further feature relates to the provision of a meter which may be completely assembled and calibrated at the factory, and which may then be shipped to the point of installation and there installed without the need of further adjustment or calibration, thus making it possible to avoid difficult and undesirable adjustments at places where they cannot be readily made. Furthermore, this feature will make it possible to sell these devices to users of vehicles which are already in operation, since the meters of the present application do not need to be installed as factory or original equipment but may be installed by garages or service stations without the need of using special equipment for that purpose.

A further feature in connection with the foregoing is to construct the meter as a fully self contained device which does not need to be especially or peculiarly related to other devices of the vehicle in order to cause it to properly perform its functions. By so doing the meter of the present invention may be easily installed by merely opening the gas or fuel line leading to the carburetter and then connecting the inlet and delivery connections of the meter to the two ends of the gasoline line so opened. This feature will also enhance the usefulness of the meters of this invention for installation in vehicles which have already been placed in service or built.

A further feature of the invention is to provide a meter which is of extremely simple construction and arrangement, which can be very cheaply and easily manufactured by simple manufacturing processes, which will not get out of order in any ordinary service or treatment, which shall be very small and compact, and which shall in other ways effectively meet the requirements for a satisfactory meter for the service herein referred to.

Other features and uses will appear from a detailed explanation of the invention and the invention consists in the features of invention and combinations of parts hereinafter described and claimed.

In the drawings:

Fig. 1 shows a plan view of a meter embodying the features of the present invention;

Fig. 2 shows a vertical section substantially on the line 2—2 of Fig. 1 looking in the direction of the arrows;

Fig. 3 shows a cross section substantially on the line 3—3 of Fig. 2 looking in the direction of the arrows;

Figs. 2 and 3 may also be considered as sections on the lines 2—2 and 3—3 of Figs. 3 and 1 respectively.

Fig. 4 shows a face view of the assembled meter looking at the counter side thereof;

Fig. 5 shows a section on the line 5—5 of Fig. 3 looking in the direction of the arrows;

Fig. 6 shows a fragmentary plan view of the counter and related parts and shows the gear wheel of the counter which is moved by the rotations of the metering wheel;

Fig. 7 shows a section through a modified form of hub for the type of construction illustrated in Figs. 1 to 6 inclusive;

Fig. 8 shows a fragmentary face view of the end portion of one of the fins.

Fig. 9 shows a cross section through a modified type of meter embodying the features of the present invention;

Fig. 10 shows a longitudinal section on the line 10—10 of Fig. 9 looking in the direction of the arrows;

Fig. 11 shows a section on the line 11—11 of Fig. 9 looking in the direction of the arrows; and Fig. 12 shows a cross section through the hub illustrated in Fig. 9 but on considerably enlarged scale.

Referring first to construction shown in Figs. 1 to 8 inclusive, the same includes a wheel designated in its entirety by the numeral 15. This wheel is preferably sectional in form including a circular side plate 16 having a series of curved fins 17 projecting sidewise therefrom and establishing between them a series of curved passages 18. The fins 17 are formed substantially on the arcs of circles, and each of said fins is approximately semi-circular in dimension.

The inner ends of the passages 18 terminate at the inside of the wheel and the outer ends of said passages terminate at the periphery of the wheel. That is to say the inner ends terminate within the space 19 which constitutes a relatively small chamber in the central portion of the wheel.

The other side of the wheel is completed by a circular plate 20 which may be drawn firmly and evenly against the edges of the fins as by means of a series of through bolts 21 or in any other manner. If desired a paper sheet may be set against the face of the side plate 20 before said side plate is set into place; and such paper sheet is preferably brushed with shellac and is then stuck to the surface of the plate 20, the exposed face of the paper sheet being then brushed with shellac and stuck against the edges of the fins. This paper sheet will thus constitute in effect a gasket and the shellac will serve to establish a perfect seal of lasting quality since the shellac is not soluble in gasoline.

The wheel is provided at the other side with a hub 22. In the form of Figs. 1 to 6 inclusive this hub is an integral projection from the wheel side plate 16; whereas in the modified construction of Fig. 7 the hub takes the form of a pin of hard steel or the like 23 threaded into a boss 24 on the outer face of the wheel.

The wheel cover plate 20 is provided with a circular perforation 25 of sufficient size to pass the inlet pipe 26 and leave a sufficient clearance around said pipe to allow the wheel to turn freely and also to allow for a return of mercury or other bath to the center wheel. The inner end of the inlet pipe 26 is turned upwards at right angles as illustrated in Fig. 3 in particular; and said inner end is preferably flattened as shown at 27 so as to enable the inlet pipe to be accommodated within a wheel of thinner dimension and without substantial restriction of the cross sectional area of the pipe at this point. The upwardly extending portion 27 of the inlet pipe reaches upwards within the inner chamber 19 of the wheel a substantial distance, but not far enough to interfere with the travel of the fins 17 as the wheel rotates. Furthermore, the upturned portion 27 of the inlet pipe has its discharge end somewhat above the highest point of the wheel opening 25 so that the level of the mercury or other bath may stand intermediate between the upper discharge end of the inlet pipe and the position of the opening 25.

A suitable housing or casing is provided. In the form indicated the same includes a circular cup shaped member 28 having a peripheral flange 29 against which a circular cover plate 30 is secured and held in place in any convenient manner as by means of tap screws 31. The wheel hub 22 is journaled in a suitable housing 32 of the member 28, the details of which will be explained presently. This establishes a very nice bearing for the wheel which is therefore free to rotate with a minimum amount of friction.

The inlet pipe 26 is sealed to the housing plate 30 as shown at 33 in any convenient manner as by welding or otherwise. As a consequence the inlet pipe is held rigid and is centrally positioned with respect to the axis of rotation of the wheel.

A suitable discharge pipe 34 is connected to the upper portion of the casing, preferably at the highest point thereof, so that all air will be initially discharged from the apparatus so that when the delivery of gasoline or other liquid once commences it will continue uninterruptedly.

A suitable counter 35 is provided in conjunction with the wheel member. In the particular construction illustrated this counter is a self contained unit located within the extension 36 at the side of the cup shaped housing member, said extension being provided with a window 37 through which the readings of the counter may be observed. This counter is provided with notched wheel or the like 38 which will be engaged by a lug 39 each time the wheel member completes a revolution. The counter is preferably calibrated to read directly in gallons or other units of liquid measure.

In the hub construction illustrated in Fig. 3 the hub member 22 is drilled and is hollow being provided with the axial bore 40. One or more side openings 41 are drilled into the axial bore 40. A screw 42 is threaded into the end of the axial bore so that upon tightening up said screw any oil or lubricant contained in the axial bore will be advanced and a portion of it forced out through the openings 41 against the weight of the stationary bearing member. This stationary bearing member 32 is slightly counter bored as shown at 43 so that the oil will be forced into the counter bore and against the bearing seats at the inner and outer ends thereof.

After the screw 42 has been adjusted to the proper position to just cause oil to seep out from the bearings at the ends of the counter bore a cap 44 is threaded onto the end of the bearing member 42. This cap is provided with a central opening which is intended to receive a screw 45. Said screw after being adjusted may be locked by means of a lock nut 46.

Before setting the screw 45 in place additional oil may be introduced through the opening in the cap nut 44 so as to completely fill the end portion of the stationary bearing member 32, after which the screw is threaded into place and tightened up to the desired extent. After this screw is tightened up it will place the oil at the outer end of the stationary bearing member under a slight pressure which will be exerted against the end of the hub member 22 and will tend to force the wheel over towards the right of Fig. 3. By setting the screw 45 to the desired position the wheel will be shifted over very slightly and just enough to carry its shoulder 47 away from the inner face of the housing member 28. When this condition is established the wheel will rotate on an oil step bearing since, as will presently appear, the natural tendency will be for the wheel to shift sidewise towards the left in Fig. 3. If desired a small boss 48 may be provided on the elbow of the inlet pipe 26 so as to limit the movement of the wheel towards the right in Fig. 3 while leaving enough clearance for normal movements and adjustments.

If desired a small extension chamber 49 may be provided in the lower portion of the housing member 28, a screw 50 of considerable diameter threading into the extension 49. A lock nut 51 may be provided on said screw for locking the same after adjustment. This screw thus provided serves as a convenient means for raising or lowering the level of the bath a slight amount so as to establish the exact calibration desired for accurate operation and to bring the instrument into the best operating condition.

The normal level of the mercury or other bath is indicated at 52 in Fig. 2. This is indicated by a full line extending across the figure except at the points where the fins and inlet pipe 27 break through the surface of the bath. The bath may be of any suitable liquid, but preferably a liquid which is heavier than the liquid being metered, and also a liquid which does not mix with or dissolve the liquid being metered and does not re-act chemically with it or have any other deleterious or objectionable action therewith. In many cases mercury will be found to be a very desirable liquid for the bath, especially on account of its very high specific gravity and also on account of its stability and the fact that it remains highly fluid through a very wide range of temperature variation reaching to approximately 40° below zero Fah. In some cases it may be found to be desirable to treat the mercury in a preliminary manner by amalgamating therewith a very small percentage of some other metal, the percentage however being so small as not to affect the fluidity and permanency of the liquid bath for the purposes of the present operation.

Assuming that the bath is of mercury and that the initial level is substantially at the line 52, the operation is substantially as follows:

With the inlet gasoline coming in through the pipe 26 at a slight pressure, say ¾ of a pound or 12 ounces per square inch, and with the outlet connection 34 closed, as would be the case where the carburetor was not taking any gasoline, and also assuming that all air had been previously eliminated from the system, the pressure within the chamber 19 would be the same as the pressure in the upper portion of the housing and outside of the wheel. In this connection it is to be remarked that the fins 17 and the liquid level 52 are initially so adjusted and proportioned that the inner end of each passage 18, is sealed a short interval before its outer end is uncovered so that direct communication through the passage 18 from the inlet chamber 19 to the space outside of the wheel is always avoided.

Under the conditions above explained the liquid level in communication with the inlet pipe 27 is the same as the liquid level outside of the wheel. Assuming now that the gasoline is allowed to be delivered through the pipe 34, this will cause a lowering of the pressure in the upper portion of the chamber and outside of the wheel. The surface of the bath will immediately re-adjust itself by a slight lowering of surface of all portions of the bath which are in direct communication with the inlet pipe 27 and a slight raising of all portions of the surface of the bath which are in direct communication with the space outside of the wheel. That is to say the bath will rise to the level 53 (see Fig. 2) for all portions thereof which are either directly in communication with the space outside the wheel or which communicate therewith through the medium of passages 18. This is the condition for the three right hand passages in Fig. 2 and also for the extreme left hand passage in said figure.

All other portions of the bath which are directly in communication with the inlet pipe 27, being the surface in the space 19 as well as the surface in those passages 18 which have their inner ends in communication with the space 19, will have their surface lowered to the point 54 (see Fig. 2) so that the difference in level between the new surfaces 53 and 54 will balance the difference in pressure between the inlet and outlet connections.

It will be noted that this difference in pressure will take the form of an eccentric unbalancing of the upward pressure on the wheel, since the upward pressure on those fins 17 at the left hand side of Fig. 2 and which have their outer ends sealed by the bath, is greater than the upward pressure on the fins at the right hand side of the bath, by an amount depending on the projected area of the sealed left hand fin and also depending on the difference in pressure of the inlet and outlet sides of the system.

Inasmuch as this upward difference in pressure is eccentrically exerted it follows that there is a rotative tendency created tending to turn the wheel in the direction of the arrow 55 in Fig. 2. This rotative tendency is dependent upon the amount of unbalanced upward pressure as well as the eccentricity just referred to, but the amount is sufficient to cause the wheel to rotate when there is only a very slight difference of inlet and outlet pressures.

It will be understood that when the delivery of gasoline from the meter through the pipe 34 commences, the re-adjustment of levels will take place automatically and gradually and as the difference in levels becomes greater and greater the rotative tendency on the wheel increases until it becomes sufficient to overcome frictional resistance at the hub after which the rotation will continue without substantial change in the difference in levels. As soon as the delivery of gasoline ceases the pressure outside of the wheel will rise to the same amount as the inlet pressure and the uniformity of level will be restored. By proper design of hub and other parts the friction will be reduced to a very low figure and only a very slight difference in level will be necessary in order to commence rotation. This difference will be only a small fraction of an ounce per square inch and will only represent a small fraction of an inch difference in liquid level.

If the maximum different of level for ordinary operations should even be as much as say ⅛ of an inch of mercury, the fins should be made of such length, and the mercury level should be established at such a point, that this difference of ⅛ of an inch in level would not expose both ends of any passage 18 simultaneously. In other words the design of the instrument should preferably be such that under the most adverse operating conditions normally encountered the gasoline would not be allowed to flow directly through the instrument without causing normal rotation of the wheel.

In connection with the foregoing it will be noted that if at any time the wheel should be blocked or become stuck so that it could not rotate, the gasoline could be nevertheless passed through it from the inlet pipe 27 to the delivery pipe 34, and this operation would only necessitate a sufficient unbalancing of liquid levels to allow the gasoline to flow directly through at least one passage 18. Ordinarily this result would be accomplished by an unbalancing of 1/4 of an inch of mercury or thereabouts since this would expose one or more of the passages 18 at both ends, or would expose the central wheel opening 25 so that the gasoline could flow directly through the same and to the space outside the wheel.

It is thus evident that I have provided a device which will meter the fuel under all ordinary conditions of operation, and will also allow the fuel to pass through it without undue interference and without metering in case of emergency. This will insure a continuous uninterrupted delivery of fuel to the motor.

The operation of this meter will be further understood from the following statement:

After the inner end of each of the passages 18 rises above the mercury level it comes directly into communication with the inside chamber 19 and with the inlet pipe 27. As rotation continues in the direction of the arrow 55 of Fig. 2 such passage 18 becomes more and more depleted of mercury and simultaneously filled with gasoline, until when the passage is at the highest elevation both its inner and outer ends are simultaneously sealed by the mercury bath. Shortly thereafter the outer end of said passage lifts above the mercury of the bath and becomes exposed directly to the space outside of the wheel. As the rotation continues the inner end of said passage moves lower and lower into the mercury bath so that said passage becomes more and more filled with mercury moving in from its inner end, the gasoline being simultaneously delivered through the outer end and into the space outside of the wheel.

It thus occurs that during each revolution of the wheel there is transferred from the inlet chamber 19 to the space outside of the wheel an amount of liquid substantially equal to the total volume of all of the passages 18 (disregarding the slight volume at the ends of the said passages which seal by the mercury bath). A slight adjustment of this volume so transferred may be made by raising or lowering the level of the bath as by means of the calibration screw 50.

In the particular construction illustrated in Figs. 1 to 8 inclusive and of the size illustrated therein (the wheel having an interior clearance of 1/4 inch and a diameter of approximately 2 1/2 inches) there will be transferred substantially 1 cubic inch of liquid per revolution of the wheel.

It will be noted that any change of level of the instrument pivoting on the axis of the wheel will simply change the angle of the surface of the mercury bath with respect to the delivery connection 34, and will not cause any change in the accuracy or operation of the instrument. This is true for considerable change of angle and will be true of all changes of gradient either up or down hill which will ordinarily be encountered in the practical operation of the instrument on motor vehicles. Thus for example in Fig. 2 I have illustrated by the dotted line 56 a new level for the surface of the bath and lying at an angle of substantially 20 degrees with respect to the level position of the instrument.

It will also be noted that variations of level of the instrument transversely thereof, that is, sidewise and pivoting about an axis extending from front to rear of the instrument, will cause a change of level of the bath such as shown by the dotted line 57 in Fig. 3. This will tend to raise the level of the mercury at one side of the wheel and depress it at the other side thereof. Inasmuch as the inlet connection 27 lies in the same medial plane as the delivery openings at the outer ends of the passages 18 it follows that slight angular changes of the level of the bath as shown by the line 57 will not adversely affect the operation of the instrument. Such changes however, if of considerable amount might affect the operation of the device by causing a premature exposing of the inner and outer ends of the passages 18 above the surface of the mercury bath due to a lifting of the corners of the fins above the surface of the bath. In order to offset this possible tendency the inner and outer ends of the fins 17 may be curved as shown by the line 58 in Fig. 8 so as to carry the corners 59 and 60 down a slight distance below the central portion of the edge of the fin, this pointing of the fins at 59 and 60 being sufficient to neutralize any change of surface of the bath throughout all normal angles to be expected in the operation of the device. With this arrangement the instrument will always operate accurately for any normal changes of angle either up hill or down hill and when traveling either on the crown of the road or at a considerable tilt on either side of the crown.

The modified hub construction shown in Fig. 7 will be found desirable to be used in many cases. In this case there is provided a block of wood 61, preferably hard wood, the same being boiled in oil and set into a socket 62 in the casing member 28. The hub pin 23 is of hard steel and turns nicely in the block 61. If desired a cap 63 may be screwed onto the end of the projection 62, and in some cases it will be desirable to place a shim 64 of hard steel against the inside face of the cap, the same constituting also a thrust bearing for the pin 63. By setting in a shim of proper thickness the wheel will be established at the proper clearance within the casing and at the same time a practically frictionless bearing will be provided.

It will be understood that due to the fact that the gasoline or other liquid is under a slight pressure within the casing of the instrument there will be a tendency for the wheel to set itself over towards the left in Figs. 3 and 7, inasmuch as the hub has a certain cross sectional area the inner end of which will be affected by the pressure within the casing and the outer end of said hub area being affected by a different pressure. As a consequence there will be a tendency for the wheel to always rotate with the pin 23 against the shim 64 or with the hub 22 against the oil step bearing (in Fig. 3).

In connection with the foregoing it will be also noted that the presence of liquid bath will create a buoyancy on the wheel tending to float the same and thus relieve the hub of a part of its load. In the case of a wheel of iron or steel working in a bath of mercury it will be found that when the surface level 52 is established a certain distance above the axial position of the wheel the buoyancy of the mercury on the steel wheel will exactly carry the same so that the only load to be carried by the hub will be that necessary to keep the wheel properly aligned and exactly rotating. In this connection it is noted that the specific gravity of mercury is substantially 13.58 whereas the specific gravity of carbon steel is substantially 7.82, the ratio between the two specific gravities being substantially .576. That is to say the wheel in such case will float with somewhat more than ½ of its metal submerged in the mercury so that the theoretically correct position for the surface level 52 is somewhat above the center line or axis of the wheel, which fact is in harmony with the fact that the surface level 52 must be above the position of the wheel opening 25 in order to establish the necessary seal between the inlet chamber 19 and the outside of the wheel.

Consequently it is possible to design this instrument so that the wheel will be almost perfectly balanced in the mercury bath and at the same time the necessary conditions of sealing secured.

The metal of the wheel and of the casing should be such that it will not be injured or will not itself injure either the bath or the liquid being metered. In the instant case these metals should be such as to resist the actions of mercury and gasoline and also such as not to injure either mercury or gasoline. Many metals amalgamate with mercury; but by a proper selection of iron or steel for the wheel and casing, as well as the inlet and delivery pipes, any amalgamating action will be avoided.

It will be noted that in case the instrument illustrated in Figs. 1 to 8 inclusive should be turned up-side-down and then again righted some of the mercury might work over into the pipe 26. In order to make it possible to ship the instrument completely assembled including the mercury bath the ends of the pipes 26 and 34 may be capped by iron or steel caps as shown by the dotted lines 65 and 66 in Fig. 3. By this means it is possible to accurately calibrate the device at the factory and then ship it notwithstanding the presence of the liquid mercury therein.

Upon receiving the device and preparatory to installing it it may be turned over into the upright position, and by turning it in the proper directions any mercury in the pipe 26 will be first discharged therefrom and then afterwards all of the mercury will be run down into the lower portion of the casing. Therefore, preparatory to installing the instrument it should first be turned up-side-down so as to allow all the mercury to collect into the lower portion of the casing and wheel as thus inverted (being actually the top part of the structure). Due to the enlargement 36 in the casing, and any other enlargement, if necessary, the entire volume of mercury will be accommodated below the position of the inlet pipe 27 as thus inverted. Thereafter, the instrument may be righted by turning it in the direction of the arrows in Fig. 3 whereupon the mercury will be allowed to settle down into the lower portion of the casing without becoming trapped in the pipe 27, thus leaving the inlet pipe entirely unoccupied by mercury.

It will be noted that if desired this instrument can be operated in an inverted position, the bath floating on top of the liquid being metered. This would be true in the case of metering liquids which are heavier than the bath. For example, by using a bath of oil and operating the meter in an inverted condition it is possible to use it for metering water and other heavier liquids.

It will be noted that in the operation of this meter, as the wheel rotates, its fins act in the manner of a screw, and the mercury will be transferred from the interior of the wheel to its exterior. This fact will be appreciated by reference to the left hand portion of Fig. 2 wherein it will be noted that as each of the passages 18 moves upwards the mercury therein is transferred towards the outside of the wheel. The mercury will return to the interior of the wheel through the opening 25 around the inlet pipe 26. This opening is therefore made of sufficient clearance around the inlet pipe to allow for such return flow without impeding the flow of the mercury.

If desired, other openings 67 (see Figs. 3 and 7) may be formed at the other side of the wheel and close to the position of the hub, which holes are also sealed by the mercury level but serve to give additional returning flow capacity. In this connection it will be noted that the total volume of mercury displaced per revolution is the same as the total volume of gasoline or other liquid displaced per revolution.

Referring now to the construction shown in Figs. 9, 10, 11 and 12, in this case the wheel 68 is provided with a series of radial fins 69 which terminate at their outer ends in circular vanes 70 which overlap each other to a certain extent to be presently explained. The wheel 69 has at the other side a cover plate 71 which serves in conjunction with said fins and vanes to establish the chambers 72. The wheel also has an extension inlet chamber 73 at one side, the cover plate 74 of which is provided with an opening 75 to receive the inlet pipe 76. This inlet pipe reaches into the chamber 73 and is upturned therein as shown at 77 and reaches to a point sufficiently above the surface 78 of the mercury or other liquid bath.

The wheel is suitably journaled as will be presently explained and the inlet pipe 76 is sealed to the casing 79 at the point 80. The delivery pipe 81 is connected to the upper portion of the casing in manner similar to that already explained in reference to the other form of construction.

The side plate 71 which incloses the chamber 72 is provided with a series of openings 82 such as shown in Fig. 11. These openings lead into the respective chambers 72 and stand in close proximity to the radial fins 69 on the leading side with reference to the direction of rotation as shown by the arrows 83 in Fig. 10. In this connection reference to Fig. 11 shows one of the fins 69 in dotted lines so that the relative positioning of these parts will be readily understood. The openings 82 are so located and shaped that as the wheel rotates these openings rise above the surface of the mercury co-incidentally with the rising of the leading ends of the chambers 72 above the mercury. In this connection it will be noted that the fins 69 are not truly radial but they are formed tangentially to a circle which passes substantially through the axis of the device, and the liquid bath surface is also tangent to said circle.

As each opening 82 rises above the surface of the mercury and into communication with the inlet chamber 73 the gasoline can flow sidewise through said opening into the corresponding wheel chamber 72. Simultaneously the wheel chamber is rising above the mercury level and the mercury is flowing out through the curved passage 84 leading therefrom. As the rotation continues the opening 82 will commence to dip down below the surface of the mercury and a sealing action will commence which will finally culminate at the time that the outer end of the opening 82 is covered by the mercury. The passage 84 is of sufficient length to remain submerged until the opening 82 has been sealed and for a very slight length of time thereafter.

As the rotation continues the end of the passage 84 will rise above the surface of the mercury bath so that the chamber 72 will thereafter be exposed to the space around and above the wheel and inside of the casing. As the rotation continues the mercury will flow in through the opening 82 and the gasoline will be displaced from the chamber 72 and this operation will continue until finally the chamber 72 and its passage 84 are completely submerged as shown in the lower portion of Fig. 10.

Fundamentally therefore it may be said that this construction of instrument differs from that of Figs. 1 to 8 inclusive chiefly in the fact that the chambers have side openings in conjunction with peripheral openings instead of central openings in conjunction with peripheral openings.

A suitable counter 85 may be provided in an extension 86 of the upper portion of the casing, said counter being advanced periodically by the projection 87 on the wheel; and a window 88 may be provided for reading of the counter from time to time.

The hub illustrated in Fig. 12 is well adapted for use with the instrument of Figs. 9, 10 and 11. This hub includes a hollow pin 89 anchored at one end in the side wall of the casing 79 and at its other end in a boss 90 on the knee of the inlet pipe 76. This pin 89 is hollow and a screw 91 is provided at its outer end, by tightening up which screw, oil or other lubricant contained within the pin may be forced along and out through the openings 92 into the central portion 93 of the wheel opening. The extreme side portions 94 and 95 of the wheel bearing rest upon the pin and are lubricated from the inside in the manner readily evident from Fig. 12.

A lock nut 96 may be provided on the screw 91 if desired.

While I have herein shown and described only certain embodiments of the features of my present invention, still I do not intend to limit myself thereto except as I may do so in the claims.

I claim:

1. A meter for the purpose specified including in combination a wheel comprising a pair of side plates together with a series of curved fins between said side plates, said fins being of substantially semi-circular form with their centers of curvature located upon the periphery of a circle drawn about the axis of wheel rotation, said fins being located substantially equi-distant apart, the inner ends of said fins terminating in the center portion of said wheel and their outer ends terminating at the periphery of the wheel said fins serving to establish a series of curved passages having their inner ends in communication with the space in the central portion of the wheel and their outer ends terminating at the periphery of the wheel, a bearing hub projecting sidewise from one side of the wheel, there being a central opening in the other side of the wheel communicating with the space aforesaid, in the central portion of the wheel, a stationary inlet pipe reaching through said opening and having its inner end upturned and reaching upwardly into the upper portion of the space in the central portion of the wheel, the fins being so formed that the planes passing through the inner and outer ends of each curved passage lie outside of the wheel opening aforesaid, a suitable casing for all of said parts including a bearing for the hub aforesaid, and a bath of mercury within said casing and reaching to a level above the wheel opening and slightly above the horizontal plane established by the inner and outer ends of any given curved passage during rotation of the wheel, the upper end of the inlet pipe reaching above the surface of the mercury to deliver liquid above said surface, and a suitable indicator in conjunction with the said wheel, substantially as described.

2. A meter for the purpose specified comprising in combination a wheel, a horizontal hub reaching sidewise from one side thereof and lying entirely outside of the body of the wheel, there being a central inlet chamber in the central portion of the wheel, and there being a series of curved passages in the wheel and lying in the same medial plane at right angles to the axis of wheel rotation, all of said passages being of similar shape and curved and having their convex sides facing in the direction of wheel rotation, the inner ends of all of the passages communicating with the central inlet chamber aforesaid and the outer ends of all of the passages terminating at the periphery of the wheel, there being a central opening in the wheel opposite to the position of the hub, a stationary inlet pipe reaching through said opening and upwardly in the central chamber to the upper portion thereof to deliver liquid at such point into said chamber, a suitable casing for all said parts including a bearing for the hub aforesaid, said bearing lying entirely outside of the body of the wheel, and a bath of liquid within the casing and having its surface standing at an elevation within the casing and wheel intermediate between the central wheel opening and the upper discharge end of the inlet pipe, substantially as described.

3. A meter for the purpose specified comprising in combination a wheel, a central hub projecting sidewise from one side thereof and lying entirely outside of the body of the wheel, there being a central inlet chamber in the central portion of said wheel together with a series of curved passages all of the same shape having their inner ends in communication with the inlet chamber and their outer ends terminating at the periphery of the wheel, all of said passages lying in the same medial plane at right angles to the axis of wheel rotation and having their convex portions facing in the direction of wheel rotation, a suitable casing for all of said parts including a bearing for the hub, said bearing lying entirely outside of the body of the wheel and a suitable bath within said casing and having its surface extending through the central inlet chamber above the axial line thereof, substantially as described.

4. A meter for the purpose specified having a series of substantially semi-circular tubular passages lying in overlapping relationship within a common vertical medial plane and with all of their convex portions facing in the same direction of wheel rotation, the inner ends of all of said passages being located around a common central inlet chamber and the outer ends of all of said passages terminating in a common circle, an inlet pipe reaching directly into the central inlet chamber aforesaid, a suitable common horizontal axis of rotation for all of the passages and lying transversely of the common medial plane aforesaid, and a suitable liquid seal having its surface parallel and above the axis of rotation and extending through the central inlet chamber aforesaid, substantially as described.

5. A meter for the purpose specified having a series of substantially semi-circular passages located in overlapping relationship and lying within a common vertical medial plane, the inner ends of all of said passages terminating at regular points around a central horizontal axis lying at right angles to the plane aforesaid and the outer ends of said passages terminating at regular intervals at a greater distance from the axis aforesaid than the inner ends of the passages, means for establishing a central inlet chamber in communication with the inner ends of the passages, an inlet pipe reaching directly into said inlet chamber, means for permitting the passages to rotate in unison about the said axis, and a suitable bath having its surface substantially parallel to and above the axis and reaching through the central inlet chamber aforesaid, substantially as described.

6. A meter for the purpose specified comprising in combination a series of curved passages lying in overlapping relationship within a common medial plane and having their inner ends in communication with a central inlet chamber and their outer ends located at a distance from said inlet chamber measured on a medial plane, means for supporting all of said passages and permitting them to rotate as a group about a common horizonal axis, means for introducing a liquid to be metered into the central inlet chamber, a suitable bath having its surface extending through the inlet chamber and lying above the position of the axis, and means for raising and lowering the bath surface for the purpose of adjusting the same with respect to the passages, substantially as described.

7. A meter for the purpose specified comprising a wheel having a series of chambers, a central inlet chamber, the inner ends of all of the first mentioned chambers communicating with the central inlet chamber, the outter ends of all of the first mentioned chambers terminating at the periphery of the wheel, means for introducing liquid to be metered into the central inlet chamber, a suitable mounting for the wheel permitting rotation thereof about a central horizontal axis, a suitable casing for all of said parts, a suitable bath within the casing and having its surface lying above the position of the axis and extending through the inlet chamber, and means for adjusting the elevation of the surface of the bath, substantially as described.

8. A meter for the purpose specified comprising in combination a circular wheel having in its central portion a circular inlet chamber, and also having a series of regularly curved passages extending in overlapping relationship from said central chamber to the periphery of the wheel, all of said passages lying in the same vertical medial plane, an inlet pipe reaching directly into said central chamber and in the position of said medial plane, a suitable casing enclosing said wheel, a liquid bath within said casing and submerging the lower portion of the wheel and reaching through the inlet chamber, and a suitable journal mounting for the wheel permitting rotation thereof, substantially as described.

9. A meter for the purpose specified comprising in combination a vertical circular wheel which is relatively thin as compared to its diameter, there being a central inlet chamber within said wheel and also a series of regularly curved overlapping passages in the wheel extending from the central inlet chamber to the periphery of the wheel, said passages being of the full width of the wheel, means for introducing liquid to be metered into the inlet chamber and at the medial plane of the wheel and passages, a suitable casing for the wheel, sealing liquid within the said casing and submerging the lower portion of the wheel and reaching into the inlet chamber aforesaid, and a suitable journal mounting for the wheel substantially as described.

10. A meter for the purpose specified comprising in combination a vertical circular wheel, there being a central inlet chamber within said wheel and also a series of regularly curved passages extending in overlapping relationship from the central inlet chamber to the periphery of the wheel, an inlet pipe reaching directly into the central inlet chamber, a bearing pin projecting sidewise from the wheel and lying to the outside of the wheel, a suitable casing for the wheel, and a bearing block for said bearing pin, said bearing block being located in the casing entirely outside of the wheel, and a suitable sealing liquid in the casing submerging the lower portion of the wheel and reaching into the inlet chamber, substantially as described.

THOS. A. BANNING, Jr.